United States Patent
Bueser et al.

(10) Patent No.: US 10,359,017 B2
(45) Date of Patent: Jul. 23, 2019

(54) ELECTROMAGNETICALLY ACTUATED RATE CONTROL VALVE, IN PARTICULAR FOR CONTROLLING THE DELIVERY RATE OF A HIGH-PRESSURE FUEL PUMP

(71) Applicant: Robert Bosch GmbH, Stuttgart (DE)

(72) Inventors: Wolfgang Bueser, Benningen (DE); Juergen Haller, Sachsenheim (DE); Heiko Roth, Heilbronn (DE); Ruthard Bonn, Schwaebisch Hall (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/559,752

(22) PCT Filed: Feb. 5, 2016

(86) PCT No.: PCT/EP2016/052574
§ 371 (c)(1),
(2) Date: Sep. 19, 2017

(87) PCT Pub. No.: WO2016/150607
PCT Pub. Date: Sep. 29, 2016

(65) Prior Publication Data
US 2018/0045154 A1 Feb. 15, 2018

(30) Foreign Application Priority Data
Mar. 25, 2015 (DE) ........................ 10 2015 205 430

(51) Int. Cl.
*F16K 31/06* (2006.01)
*F02M 59/36* (2006.01)
(Continued)

(52) U.S. Cl.
CPC .......... *F02M 59/367* (2013.01); *F02M 59/44* (2013.01); *F02M 59/445* (2013.01);
(Continued)

(58) Field of Classification Search
CPC .... F02M 59/367; F02M 59/445; F02M 59/44; F02M 59/466; F02M 2200/03; F02M 2200/9061; F16K 31/0655
See application file for complete search history.

(56) References Cited

U.S. PATENT DOCUMENTS

2003/0089343 A1* 5/2003 Yamaguchi ............... C23C 8/80
123/495
2012/0288389 A1* 11/2012 Kuroyanagi ....... F02M 63/0077
417/559
(Continued)

FOREIGN PATENT DOCUMENTS

DE 101 31 125 A1 9/2002
DE 10 2010 062 451 A1 6/2012
(Continued)

OTHER PUBLICATIONS

International Search Report corresponding to PCT Application No. PCT/EP2016/052574, dated Apr. 8, 2016 (German and English language document) (5 pages).

*Primary Examiner* — Ian G Paquette
(74) *Attorney, Agent, or Firm* — Maginot, Moore & Beck LLP

(57) ABSTRACT

An electromagnetically actuable rate control valve for controlling a delivery rate of a high-pressure pump includes an electromagnet, a valve element, an armature shaft, and at least one strength element. The valve element is movable in an axial direction and is configured to open and to close the electromagnetically actuable rate control valve. The armature shaft transmits a force. The force is produced by the electromagnet and acts on the valve element in the axial direction. The at least one strength element is configured to raise at least the strength of the armature shaft. The armature shaft includes a needle region adjacent to the valve element and an armature region remote from the valve element. The needle region and the armature region are integral with each other.

17 Claims, 4 Drawing Sheets

(51) Int. Cl.
*F02M 59/44* (2006.01)
*F02M 59/46* (2006.01)

(52) U.S. Cl.
CPC ....... *F02M 59/466* (2013.01); *F02M 2200/03* (2013.01); *F02M 2200/9061* (2013.01); *F16K 31/0655* (2013.01)

(56) References Cited

U.S. PATENT DOCUMENTS

| | | | |
|---|---|---|---|
| 2013/0323090 A1* | 12/2013 | Gerundt | F16K 31/06 417/279 |
| 2016/0312775 A1* | 10/2016 | Saso | F04B 19/22 |
| 2017/0146149 A1* | 5/2017 | Warashina | F16K 39/022 |

FOREIGN PATENT DOCUMENTS

| | | |
|---|---|---|
| EP | 1 965 069 A2 | 9/2008 |
| EP | 2 453 122 A1 | 5/2012 |
| EP | 2 554 825 A2 | 2/2013 |
| JP | 2002-106740 A | 4/2002 |
| JP | 2002-266728 A | 9/2002 |
| JP | 2002-349745 A | 12/2002 |
| JP | 2003-314738 A | 11/2003 |
| JP | 2012-154297 A | 8/2012 |
| WO | 95/16125 A1 | 6/1995 |

* cited by examiner

ELECTROMAGNETICALLY ACTUATED RATE CONTROL VALVE, IN PARTICULAR FOR CONTROLLING THE DELIVERY RATE OF A HIGH-PRESSURE FUEL PUMP

This application is a 35 U.S.C. § 371 National Stage Application of PCT/EP2016/052574, filed on Feb. 5, 2016, which claims the benefit of priority to Serial No. DE 10 2015 205 430.6, filed on Mar. 25, 2015 in Germany, the disclosures of which are incorporated herein by reference in their entirety.

BACKGROUND

The disclosure relates to an electromagnetically actuable rate control valve of the kind which is already fundamentally known from EP 2 453 122 A1, for example.

SUMMARY

The disclosure is based on the realization that armature shafts of integral design used in rate control valves are simultaneously expected to meet demanding requirements in terms of magnetic and strength properties, wherein the armature shafts are furthermore subject to the boundary conditions of a limited component size and component mass.

These requirements and boundary conditions can only be partially met simultaneously to a satisfactory extent through conventional measures, such as the selection of material for the armature shaft, since materials with good magnetic properties generally have only moderate strength and vice versa.

According to the disclosure, therefore, means for raising the strength of the armature shaft are provided.

In the present case, the term "strength" should be interpreted in a fundamentally broad way. For example, it may be a parameter which characterizes the resistance of the armature shaft to elastic and/or plastic deformation, that is to say, for example, tensile strength, resistance to pressure, compression strength, bending strength, torsional strength, shear strength and/or fatigue strength. Moreover, strength can be resistance to wear, in particular hardness and/or surface hardness. The concept of strength can also refer to the time for which the armature shaft can bear a particular load without failure, e.g. without fracture.

In the present case, the term "means" should be interpreted in a fundamentally broad way. For example, it can be a shape or a choice of material or a local modification of the material, particularly in the region of parts of the surface or of the entire surface of the armature shaft.

The term "raising" means an increase, e.g. an increase in magnitude of a parameter. In particular, this can be interpreted to the effect that, without a fixed starting point, the means is at least fundamentally suitable for raising the strength of the armature shaft. As a starting point for raising the strength, it is also possible, on the other hand, to start from the strength of the armature shaft of the rate control valve mentioned at the outset and known from the prior art.

According to the disclosure, the rate control valve has a valve element movable in the axial direction for opening and closing the rate control valve. This can preferably be a plate-shaped or at least substantially plate-shaped valve element, which can come to rest on a sealing seat, e.g. an annular sealing seat, and can thus close the rate control valve.

According to the disclosure, the armature shaft has a needle region and an armature region. In particular, the armature shaft consists of the needle region and the armature region, wherein, in particular, the needle region and the armature region are arranged in series with one another in the axial direction, preferably being arranged coaxially or at least substantially coaxially with one another. In particular, the needle region and the armature region can be cylindrical or at least substantially cylindrical sections of the armature shaft, which, in particular, are formed integrally on one another.

A diameter of the needle region is preferably smaller than a diameter of the armature region, e.g. at most half as large. The length of the needle region is preferably greater than the length of the armature region, e.g. at least twice as great.

According to the disclosure, the armature shaft, or the needle region and the armature region of the armature shaft, are formed integrally with one another. In the present case, "formed integrally" is understood to mean, in particular, that there is an integral, continuous workpiece, in particular one which is not created by joining or connecting but, in particular, is made in one piece, e.g. as a turned part or by metal diecasting and subsequent sintering. In particular, there are furthermore no further components fixed on the armature shaft, and therefore, in particular, the armature shaft fully replaces, in functional terms, a composite structure comprising an armature and a needle produced by pressing, which is likewise known from the prior art, e.g. from DE 10 2010 062 451 A1.

In a first specific embodiment of the disclosure, it is envisaged that the needle region has a smaller diameter than the armature region and that the means is a rounded portion of the edge situated at the transition between the needle region and the armature region.

The edge is preferably an inner edge situated at the transition between the needle region and the armature region. It can be a 90° edge, for example.

The term "rounded portion" should fundamentally be interpreted broadly to the extent that the relevant edge is not a sharp edge. In respect of the term "edge sharpness", attention is drawn to DIN ISO 13715:2000. In particular, an edge is regarded as sharp if it differs from an ideal sharp edge by 50 µm or less. All other edges are thus regarded as rounded, irrespective of whether the actual contour is precisely round in a mathematical sense or whether it only approximates a round contour, starting from a sharp-edged contour. In particular, a chamfer can also represent a rounded portion.

The rounded portion has the technical effect that bending stresses between the needle region and the armature region can be reduced or transmitted more effectively. In this way, fractures at the transition between the needle region and the armature region can be avoided in an effective manner.

The rounded portion can be, for example, a rounded portion with a constant rounding radius, making the rounded portion particularly simple to produce. In this case, the rounding radius can be 0.5 mm or more, for example.

On the other hand, it has been observed that the strength of the armature shaft, particularly its ability to withstand bending stresses, can be improved particularly well if a rounding radius along the rounded portion is not constant. Provision is preferably made for the rounding radius to decrease in the direction from the needle region toward the armature region, wherein the decrease provided can be continuous or in stages.

In the case of a decrease in the rounding radius in stages, therefore, a first partial rounded portion adjacent to the needle region and having a first rounding radius is provided and a second partial rounded portion facing the armature region and having a second rounding radius is provided, in particular, wherein the first rounding radius is larger than the second rounding radius, e.g. at least five times or even at least ten times as large as the second rounding radius. For example, the first rounding radius can be greater than 1 mm or even greater than 2 mm, while the second rounding radius can be smaller than 1 mm or even smaller than 0.6 mm.

In the case of a right-angled edge, each of the two partial rounded portions can form a transition through 45° or can each form a transition through at least 22.5°.

In particular, the rounded portion can consist of two partial rounded portions, even if, in principle, rounded portions having more than two partial rounded portions are also possible, the rounding radii of which differ at least in some cases from one another and, in particular, decrease in a direction from the needle region toward the armature region.

In addition or as an alternative to the first specific embodiment of the disclosure, provision is made, in a second specific embodiment of the disclosure, for the means to be a layer which is provided at least along parts of the surface of the armature shaft and the hardness of which is greater than the hardness of a base material of the armature shaft.

By means of a layer of this kind, the wear on the armature shaft can be reduced in an effective manner. Moreover, an increase in fatigue strength due to the layer, e.g. by 20% to 30% of the initial value, was measured in tests carried out by the applicant.

The hardness can be a parameter measured in HV units, for example, which can be measured using a test force of, for example, 0.01 kp and a load application time of 12 seconds. It is possible, for example, to employ what is known as nanointendation, in which measurement points in a grid pattern with spacings of 1 µm to 10 µm are detected using the abovementioned very small loads.

From the hardness measured in this way, it is possible to infer internal compressive stresses in the surface of the workpiece which, for their part, can serve as a measure of the fatigue strength of the component.

The layer can be provided along the entire surface of the armature shaft. In particular, it is envisaged that the layer is provided at least at those points on the surface of the armature shaft which come into contact with other components of the rate control valve, e.g. the valve element or stops fixed to the housing, during the operation of the rate control valve, e.g. at those points on the surface of the armature shaft which are visible in the two axial plan views of the armature shaft.

In particular, it is envisaged that the hardness of the layer is at least 900 HV, in particular at least 900 HV0.01, or even at least 1000 HV, in particular at least 1000 HV0.01. In particular, it is envisaged that the hardness of the base material of the armature shaft is significantly lower, e.g. at most 400 HV, or even only at most 200 HV, which are conventional values for ferritic steels.

Even if there is a large number of methods by means of which this layer can be produced, low-temperature diffusion methods are preferred since they can be applied to the armature shaft without the armature shaft being deformed, e.g. twisted, as a whole during the production of the layer. Preferred low-temperature diffusion methods are nitrocarburization and Kolsterizing. This results in layers in which a carbon and/or nitrogen content is raised in comparison with the base material of the armature shaft. In general, there are no microstructural changes during this process, and the relevant layer can be identified not only by hardness measurements and elementary analysis but also by discoloration, in particular brownish discoloration, in the micrographs. Moreover, the raised carbon and/or nitrogen content in the layer can be detected from the internal compressive stresses introduced, at least in principle, if only in a complex way.

In the present case, low-temperature diffusion methods are understood to mean, in particular, thermochemical methods in which the armature shaft is exposed to an atmosphere containing carbon and/or nitrogen, for example, in particular at a temperature below 650° C. or even below 350° C., and in which atoms, e.g. carbon atoms and/or nitrogen atoms, from the atmosphere diffuse into a boundary layer of the armature shaft and/or into the armature shaft.

The layer preferably has a depth of 5 µm to 50 µm, e.g. a depth of 10 µm to 15 µm. It is, in particular, the base material of the armature shaft which is arranged below this layer.

The base material is preferably a ferritic steel and/or a cold-hardened steel and/or a magnetic steel. It can furthermore be an iron-cobalt alloy.

The mass of the armature shaft is less than 3 grams, preferably even less than 2 grams, thus ensuring highly dynamic behavior of the rate control valve.

Advantageous developments are disclosed herein. Features important to the disclosure can furthermore be found in the following description and in the drawings, wherein the features can be important for the disclosure both in isolation and in various combinations without explicit further reference being made to this fact.

BRIEF DESCRIPTION OF THE DRAWINGS

Illustrative embodiments of the disclosure are explained below with reference to the drawing, in which.

DETAILED DESCRIPTION

Figure 1:
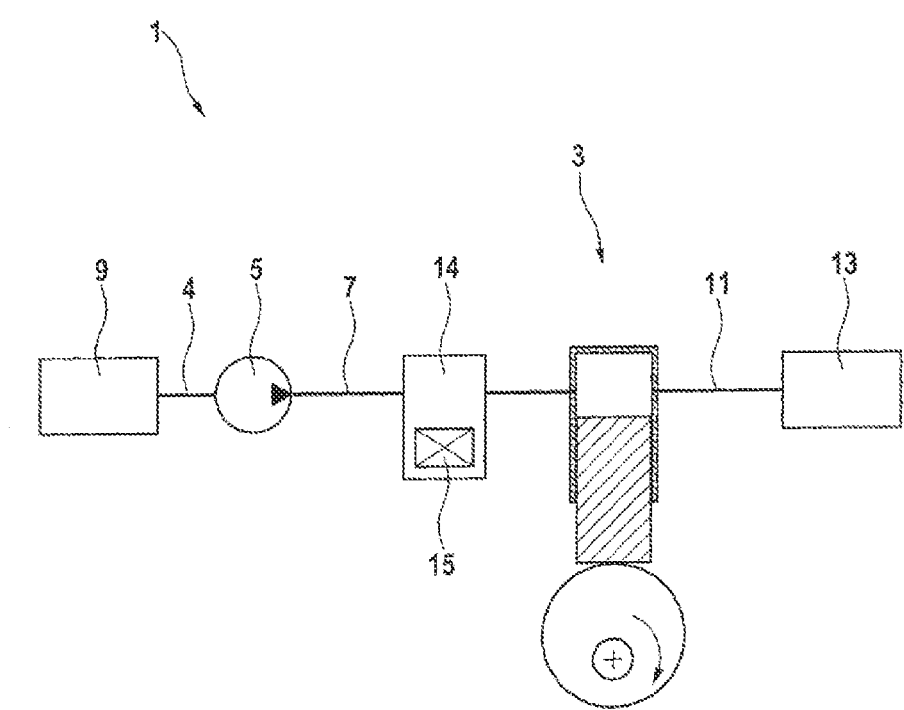
FIG. 1 shows a simplified diagram of a fuel injection system of an internal combustion engine.

FIG. 1 shows a fuel injection system 1 of an internal combustion engine in a highly simplified illustration. A fuel tank 9 is connected to a high-pressure pump 3 (not explained specifically) via a suction line 4, a pre-supply pump 5 and a low-pressure line 7. A high-pressure reservoir 13 ("common rail") is connected to the high-pressure pump 3 via a high-pressure line 11. A rate control valve 14 having an electromagnetic actuating device 15—referred to below as an electromagnetic 15—is arranged hydraulically along the low-pressure line 7 between the pre-supply pump 5 and the high-pressure pump 3. Other elements, e.g. valves of the high-pressure pump 3, are not depicted in FIG. 1. It is self-evident that the rate control valve 14 can be designed as a modular unit with the high-pressure pump 3. For example, the rate control valve 14 can be an inlet valve of the high-pressure pump 3.

During the operation of the fuel injection system 1, the pre-supply pump 5 delivers fuel from the fuel tank 9 into the low-pressure line 7. Here, the rate control valve 14 determines the fuel quantity fed to the high-pressure pump 3.

Figure 2:
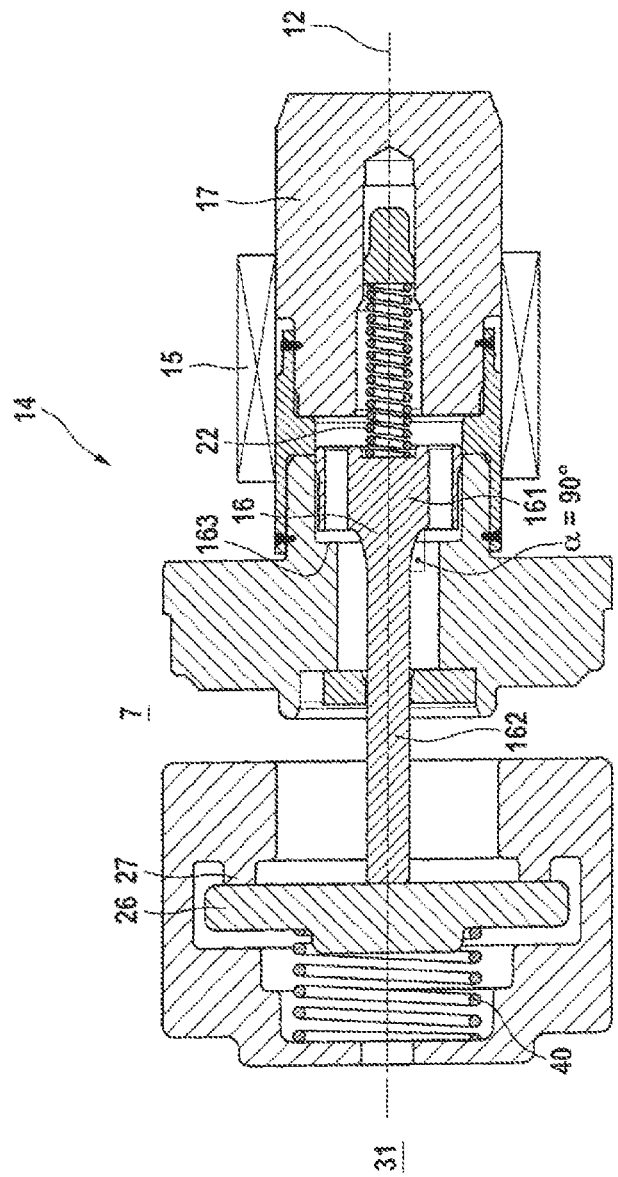
FIG. 2 shows a rate control valve according to the disclosure.

FIG. 2 shows a view of the rate control valve 14 from FIG. 1 in a sectional view. The rate control valve 14 is of substantially rotationally symmetrical design in relation to a longitudinal axis 12. The rate control valve 14 is fixed in a housing (not shown) of a high-pressure pump 3 and forms the inlet valve of the high-pressure pump 3.

The rate control valve 14 comprises a solenoid coil 15, wound over a pole core 17, and an armature shaft 16, wherein an armature spring 22 is clamped between the pole core 17 and the armature shaft 16. Through the action of magnetic forces and the restoring force of the armature spring 22, the armature shaft 16 can be moved in the axial direction between the pole core 17 and a stop 163 fixed relative to the housing.

The armature shaft 16 comprises an armature region 161, which is adjacent to the pole core 17, and a needle region 162, which is remote from the pole core 17, and is embodied in an integral manner without being connected permanently to other components.

The armature shaft 16 rests by means of its end facing away from the pole core 17 against the valve element 26 of the rate control valve 14 and, in this way, can forcibly open the rate control valve 14 against the force of the valve spring 40, e.g. in order to allow fuel to flow back out of a working space 31 of the high-pressure pump 3 into the low-pressure line 7 against the opening direction of the rate control valve 14. In a specific embodiment, the armature shaft can additionally be formed integrally with the valve element 26, i.e. can simultaneously perform the functions thereof.

In the present case, the valve element 26 has a substantially plate-shaped form and rests on an annular sealing seat 27 when the rate control valve 14 is closed.

Figure 3:
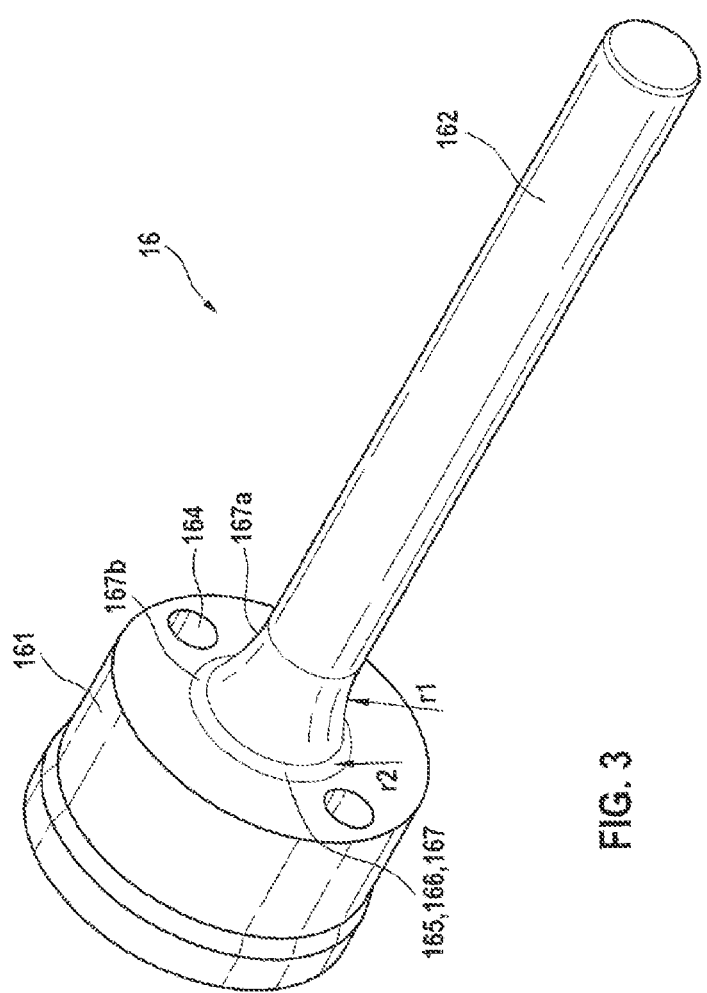
FIG. 3 shows an armature shaft of the rate control valve from FIG. 2.

In FIG. 3, the armature shaft 16 is shown in perspective on an enlarged scale. The armature region 161 and the needle region 162 both have a substantially cylindrical shape and are arranged in series in the axial direction, wherein the armature region 161 has a diameter which is more than twice as large as the diameter of the needle region 162 and wherein the armature region 161 has a length which is less than half the length of the needle region 162. The armature shaft 16 has a total length in a range of from 10-30 mm, for example.

In this example, the armature shaft 16 has two through holes 164, which extend in the axial direction through the armature region 161 and the function of which is to enable fuel to be passed through the armature region 161 of the armature shaft 16 during a movement of the armature shaft 16.

At the transition 165 between the needle region 162 and the armature region 161 there is an edge 166 designed as an inner edge, which runs radially all the way around and connects the needle region 162 to the armature region 161 at a right angle α in a section such as that in FIG. 2. In this example, the edge 166 has a rounded portion 167, which consists of a first partial rounded portion 167a and a second partial rounded portion 167b. Each of these partial rounded portions rounds off the right-angled edge 166 by approximately half, i.e. by 45°.

The first partial rounded portion 167a forms the part of the rounded portion 167 which faces the needle region 162 and has a relatively large rounding radius r1, 6.5 mm in the example. Facing the armature region 161, it is adjoined without a step and without a bend by the second partial rounded portion 167b, which has a relatively small rounding radius r2, 0.45 mm in the example.

Figure 4:
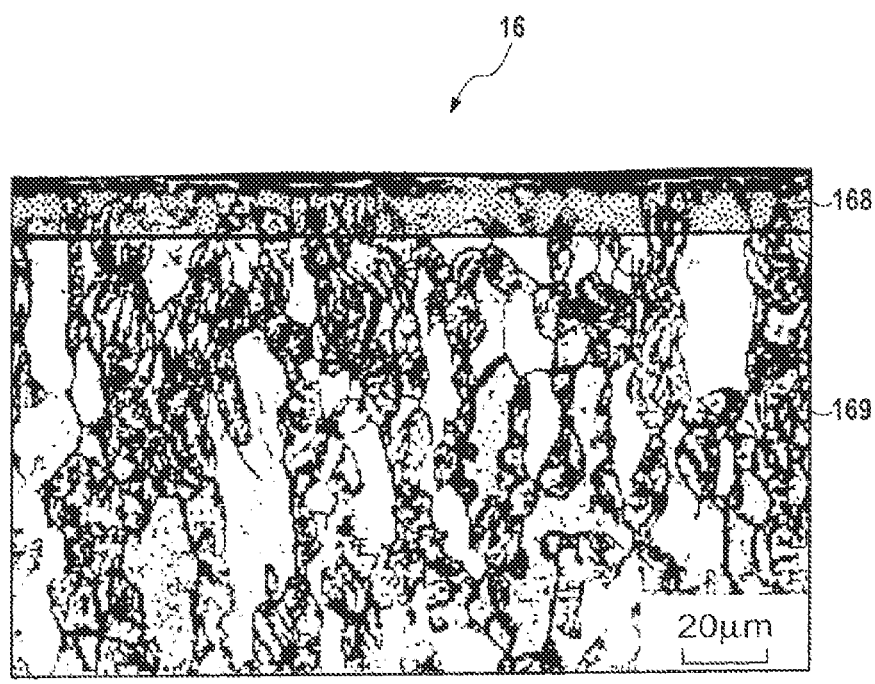
FIG. 4 shows a micrograph of the armature shaft of the rate control valve from FIG. 3.

The base material 169 of the armature shaft 16 is homogeneous and is composed of a cold-hardened ferritic material or, alternatively, of an iron-cobalt alloy. The hardness of the base material 169 is 150 HV. At the surface of the armature shaft 16 a hardened layer 168 is formed, which extends into the armature shaft to a depth of 15 μm and which has a hardness of 1000 HV. This layer has been produced by a low-temperature diffusion method, e.g. nitrocarburization or Kolsterizing. In this layer, a content of carbon and/or nitrogen is raised in comparison with the base material 169. In a micrograph (FIG. 4), the layer 168 can be identified as a brownish discoloration, while the metallurgical microstructure is otherwise unaffected.

The invention claimed is:

1. An electromagnetically actuable rate control valve for controlling a delivery rate of a high-pressure pump, the rate control valve comprising:
   an electromagnet;
   a valve element movable in an axial direction and configured to open and to close the rate control valve;
   an armature shaft configured to transmit a force produced by the electromagnet, the force acting on the valve element in the axial direction, the armature shaft including:
      a needle region adjacent to the valve element, the needle region having an outer circumferential wall defining a circumferential surface that is parallel to the axial direction;
      an armature region remote from the valve element, the armature region having an end face defining an end surface that is perpendicular to the axial direction, the armature region including at least one through hole extending in the axial direction and extending through the end surface, the needle region integral with the armature region; and
      a transition formed where the circumferential surface of the needle region meets the end surface of the armature region; and
   at least one strength element arranged in the transition, the at least one strength element configured to increase the strength of the armature shaft.

2. The electromagnetically actuable rate control valve as claimed in claim 1, further comprising:
   a housing;
   a plurality of stops disposed in fixed locations on the housing,
   wherein the armature shaft comes to rest against the plurality of stops during movement in the axial direction.

3. The electromagnetically actuable rate control valve as claimed in claim 1, wherein the armature shaft further includes a uniform base material, apart from a surface layer.

4. The electromagnetically actuable rate control valve as claimed in claim 1, wherein the armature region includes two through holes.

5. The electromagnetically actuable rate control valve as claimed in claim 1, wherein the at least one strength element is a layer that has a hardness that is greater than a hardness of a base material of the armature shaft.

6. The electromagnetically actuable rate control valve as claimed in claim 5, wherein the hardness of the layer is at least 900 HV at least along the plurality of parts of the surface of the armature shaft.

7. The electromagnetically actuable rate control valve as claimed in claim 5, wherein a first carbon content and/or a first nitrogen content of the layer is higher in comparison with a second carbon content and/or a second nitrogen content of the base material of the armature shaft, at least along the plurality of parts of the surface of the armature shaft.

8. The electromagnetically actuable rate control valve as claimed in claim 5, wherein the layer is produced by a low-temperature diffusion process including nitrocarburization, Kolsterizing, low-temperature gas nitriding, and oxynitriding.

9. The electromagnetically actuable rate control valve as claimed in claim 5, wherein the layer extends into the armature shaft to a depth in a range of 5 μm to 50 μm.

10. The electromagnetically actuable rate control valve as claimed in claim 5, wherein the base material of the armature shaft is at least one of a magnetizable steel, a cold-hardened steel, a ferritic steel, and an iron-cobalt alloy.

11. The electromagnetically actuable rate control valve as claimed in claim 1, wherein:
the needle region has a first diameter that is smaller than a second diameter of the armature region; and
the at least one strength element is a rounded portion of an edge situated at the transition.

12. The electromagnetically actuable rate control valve as claimed in claim 11, wherein an overall rounding radius decreases in a direction from the needle region toward the armature region.

13. The electromagnetically actuable rate control valve as claimed in claim 11, wherein:
the rounded portion includes a first partial rounded portion facing the needle region and having a first rounding radius, and a second partial rounded portion facing the armature region and having a second rounding radius; and
the first rounding radius is different from the second rounding radius.

14. The electromagnetically actuable rate control valve as claimed in claim 11, wherein an overall rounding radius decreases continuously in a direction from the needle region toward the armature region.

15. The electromagnetically actuable rate control valve as claimed in claim 13, wherein the first rounding radius is at least five times the second rounding radius.

16. The electromagnetically actuable rate control valve as claimed in claim 13, wherein the first partial rounded portion and/or the second partial rounded portion rounds off the edge by at least a quarter in each case in respect of an angle whereat the needle region merges into the armature region at the edge.

17. A piston-type fuel pump, comprising:
an electromagnetically actuable rate control valve including:
an electromagnet;
a valve element movable in an axial direction and configured to open and to close the rate control valve;
an armature shaft configured to transmit a force produced by the electromagnet, the force acting on the valve element in the axial direction, the armature shaft including:
a needle region adjacent to the valve element, the needle region having an outer circumferential wall defining a circumferential surface that is parallel to the axial direction;
an armature region remote from the valve element, the armature region having an end face defining an end surface that is perpendicular to the axial direction, the armature region including at least one through hole extending in the axial direction and extending through the end surface, the needle region integral with the armature region; and
a transition formed where the circumferential surface of the needle region meets the end surface of the armature region; and
at least one strength element arranged in the transition, the at least one strength element configured to increase the strength of the armature shaft, wherein the rate control valve is an inlet valve of the piston-type fuel pump.

* * * * *